US009292492B2

(12) United States Patent
Sarikaya et al.

(10) Patent No.: US 9,292,492 B2
(45) Date of Patent: Mar. 22, 2016

(54) SCALING STATISTICAL LANGUAGE UNDERSTANDING SYSTEMS ACROSS DOMAINS AND INTENTS

(71) Applicant: Microsoft Technology Licensing, LLC, Redmond, WA (US)

(72) Inventors: Ruhi Sarikaya, Redmond, WA (US); Anoop Deoras, San Jose, CA (US); Fethiye Asli Celikyilmaz, Mountain View, CA (US); Ravikiran Janardhana, Chapel Hill, NC (US); Daniel Boies, Saint-Lambert (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 13/758,683

(22) Filed: Feb. 4, 2013

(65) Prior Publication Data
US 2014/0222422 A1    Aug. 7, 2014

(51) Int. Cl.
G10L 15/00    (2013.01)
G06F 17/27    (2006.01)
G06F 17/21    (2006.01)
G06F 17/30    (2006.01)

(52) U.S. Cl.
CPC ........ *G06F 17/279* (2013.01); *G06F 17/30672* (2013.01)

(58) Field of Classification Search
None
See application file for complete search history.

(56) References Cited

U.S. PATENT DOCUMENTS

| | | | |
|---|---|---|---|
| 7,634,409 B2* | 12/2009 | Kennewick | G10L 15/08 704/231 |
| 7,805,300 B2* | 9/2010 | Gorin et al. | 704/245 |
| 8,073,879 B2 | 12/2011 | Meijer et al. | |
| 8,185,399 B2* | 5/2012 | Di Fabbrizio et al. | 704/275 |
| 8,234,312 B2 | 7/2012 | Thomas | |
| 8,380,511 B2 | 2/2013 | Cave et al. | |
| 8,548,805 B2* | 10/2013 | Chotimongkol | G10L 15/063 704/10 |
| 8,566,098 B2* | 10/2013 | Syrdal et al. | 704/257 |
| 8,676,866 B2 | 3/2014 | Lemcke et al. | |
| 8,751,240 B2* | 6/2014 | Lewis et al. | 704/275 |
| 8,775,158 B2 | 7/2014 | Sakao et al. | |
| 8,818,808 B2* | 8/2014 | Hakkani-Tur et al. | 704/243 |
| 8,856,052 B2 | 10/2014 | Chenthamarakshan et al. | |

(Continued)

OTHER PUBLICATIONS

Lee, et al., "Example-Based Dialog Modeling for Practical Multi-Domain Dialog System", In Proceedings of Speech Communication, vol. 51, Jan. 23, 2009, 19 pages.

(Continued)

*Primary Examiner* — Satwant Singh
(74) *Attorney, Agent, or Firm* — Danielle Johnston Holmes; Steven Spellman; Micky Minhas (57) ABSTRACT

A scalable statistical language understanding (SLU) system uses a fixed number of understanding models that scale across domains and intents (i.e. single vs. multiple intents per utterance). For each domain added to the SLU system, the fixed number of existing models is updated to reflect the newly added domain. Information that is already included in the existing models and the corresponding training data may be re-used. The fixed models may include a domain detector model, an intent action detector model, an intent object detector model and a slot/entity tagging model. A domain detector identifies different domains identified within an utterance. All/portion of the detected domains are used to determine associated intent actions. For each determined intent action, one or more intent objects are identified. Slot/entity tagging is performed using the determined domains, intent actions, and intent object detector.

20 Claims, 8 Drawing Sheets

(56) References Cited

U.S. PATENT DOCUMENTS

| | | | |
|---|---|---|---|
| 8,954,461 | B2 | 2/2015 | Ware et al. |
| 2006/0036430 | A1 | 2/2006 | Hu |
| 2006/0074634 | A1 | 4/2006 | Gao et al. |
| 2008/0319748 | A1* | 12/2008 | Nakano et al. ............... 704/251 |
| 2011/0093268 | A1* | 4/2011 | Gorin et al. .................. 704/249 |
| 2012/0232898 | A1 | 9/2012 | Di Fabbrizio et al. |
| 2012/0290293 | A1 | 11/2012 | Hakkani-Tur et al. |
| 2013/0066632 | A1* | 3/2013 | Conkie et al. ................ 704/260 |
| 2013/0091184 | A1 | 4/2013 | Alexe et al. |
| 2014/0022426 | A1* | 1/2014 | Minami et al. ............... 348/294 |
| 2014/0058983 | A1* | 2/2014 | Alexander ........ G06F 17/30707 706/12 |
| 2014/0059030 | A1* | 2/2014 | Hakkani-Tur et al. ........ 707/706 |
| 2014/0149121 | A1* | 5/2014 | Di Fabbrizio et al. ..... 704/270.1 |
| 2014/0207777 | A1 | 7/2014 | Palmert et al. |
| 2014/0222422 | A1* | 8/2014 | Sarikaya et al. ............. 704/231 |
| 2014/0278424 | A1* | 9/2014 | Deng et al. ................... 704/257 |
| 2014/0288935 | A1* | 9/2014 | Lewis et al. .................. 704/254 |
| 2014/0358829 | A1* | 12/2014 | Hurwitz ............ G06F 17/30303 706/12 |
| 2014/0379326 | A1* | 12/2014 | Sarikaya ................. G10L 15/18 704/9 |
| 2015/0019202 | A1 | 1/2015 | Tremblay et al. |

OTHER PUBLICATIONS

Ries, et al., "Dialogue Act Modeling for Automatic Tagging and Recognition of Conversational Speech", In Proceedings of Association for Computational Linguistics, vol. 26, Issue 3, Sep. 2000, 35 pages.

Komatani, et al., "Multi-Domain Spoken Dialogue System with Extensibility and Robustness against Speech Recognition Errors", In Proceedings of 7th SIGdial Workshop on Discourse and Dialogue, Jul. 2006, 9 pages.

Porzel, et al., "Towards Context-adaptive Natural Language Processing Systems", In Proceedings of Computational Linguistics for the New Millenium: Divergence or Synergy, May 2002, 12 pages.

Lee, et al., "Recent Approaches to Dialog Management for Spoken Dialog Systems", In Journal of Computing Science and Engineering, vol. 4, Issue 1, Mar. 18, 2010, 22 pages.

Oh, et al., "Stochastic Natural Language Generation for Spoken Dialog Systems", In Proceedings of Computer Speech and Language, vol. 16, Jan. 2012, 21 pages.

PCT International Search Report and Written Opinion in International Application PCT/US2014/013469, mailed Jan. 21, 2015, 10 pgs.

Dilek Hakkani-Tur et al., "A Discriminative Classification-Based Approach to Information State Updates for a Multi-Domain Dialog System", Interspeech 2012, 13th Annual Conference of the International Speech Communication Association, Sep. 9, 2012, XP055160586, Portland, Oregon, USA.

El-Kahky Ali et al., "Extending domain coverage of language understanding systems via intent transfer between domains using knowledge graphs and search query click logs", 2014 IEEE International Conference on Acoustics, Speech and Signal Processing (ICASSP), IEEE, May 4, 2014, pp. 4067-4071.

Dredze et al., "Online Methods for Multi-Domain Learning and Adaptation", Published Date: Oct. 25, 2008, in Proceedings of Conference on Empirical Methods in Natural Language Processing, 9 pgs.

Kaya et al., "Canonical Correlation Analysis and Local Fisher Discriminant Analysis based Multi-View Acoustic Feature Reduction for Physical Load Prediction", Published Date: Sep. 14, 2014, In Proceedings of 15th Annual Conference of International Speech Communication Association, 5 pgs.

Liu, Xiaodong et al., "Representation Learning Using Multi-Task Deep Neural Networks for Semantic Classification and Information Retrieval", Retrieved Date: Apr. 1, 2015, In Proceedings of Conference of the North American Chapter of the Association for Computational Linguistics—Human Language Technologies, 10 pgs.

PCT Second Written Opinion in International Application PCT/US2014/013469, mailed May 29, 2015, 6 pgs.

Sun, Liang et al., "Canonical Correlation Analysis for Multi-Label Classification: A Least Squares Formulation, Extensions and Analysis", Published Date: Aug. 26, 2010, In Proceedings of IEEE Transactions on Pattern Analysis and Machine Intelligence, vol. 33, Issue 1. 13 pgs.

Tao, Liang et al., "Exploring Shared Subspace and Joint Sparsity tor Canonical Correlation Analysis", Published Date: Nov. 3, 2014, In Proceedings of 23rd ACM International Conference on Conference on Information and Knowledge Management. 4 pgs.

Wang et al., "Heterogeneous Domain Adaptation Using Manifold Alignment", Published Date: Jul. 16, 2011, In Proceedings of International Joint Conference on Artificial Intellegence, vol. 22, No. 1, 6 pgs.

Yeh, Yi Ren et al., "Heterogeneous Domain Adaptation and Classification by Exploiting the Correlation Subspace", Published Date: May 2014, Proceedings: In Proceedings of IEEE Transactions on Image Processing, vol. 23, Issue 5, 10 pgs.

* cited by examiner

SCALING STATISTICAL LANGUAGE UNDERSTANDING SYSTEMS ACROSS DOMAINS AND INTENTS

BACKGROUND

In dialog systems, a single user input may refer to more than one domain and user dialog act (aka intent) for each of these domains. A Natural Language Understanding System (NLU) typically is used for a small number of domains (e.g. 1, 2, ... ). When more domains are to be supported, the scaling of an NLU system can be challenging. For example, adding a new domain to an existing language understanding system adds additional new models. Each new language added to the NLU system also adds additional models.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A scalable statistical language understanding (SLU) system uses a fixed number of understanding models that scale across domains and intents (i.e. single vs. multiple intents per utterance). For each domain added to the SLU system, the fixed number of existing models is updated to reflect the newly added domain. For example, instead of adding a completely new intent model and a new slot model as in existing SLU systems, the existing models are updated to incorporate the new domain added to a system. In this way, information that is already included in the existing models and the corresponding training data may be re-used. The fixed models may include a domain detector model, an intent action detector model, an intent object detector model and a slot/entity tagging model. A domain detector identifies different domains identified within an utterance. An utterance may identify a single domain or multiple domains. All/portion of the detected domains are used to determine associated intent actions (e.g. the actions that are associated with the detected domain(s)). An intent action is the action to be performed (e.g. find, post, play, buy ... ). For each determined intent action, one or more intent objects are identified. An intent object is an object that relates to that determined intent action. The intent object is the object of the determined intent action (e.g. movie, picture, item, ... ). Slot/entity tagging is performed using the determined domains, intent actions, and intent object detector. The order of domain/intent/slot detection is not fixed and may performed in different ways depending on the application. In this way, an utterance that applies to multiple domains is appropriately tagged.

DETAILED DESCRIPTION

Referring now to the drawings, in which like numerals represent like elements, various embodiment will be described.

Figure 1:
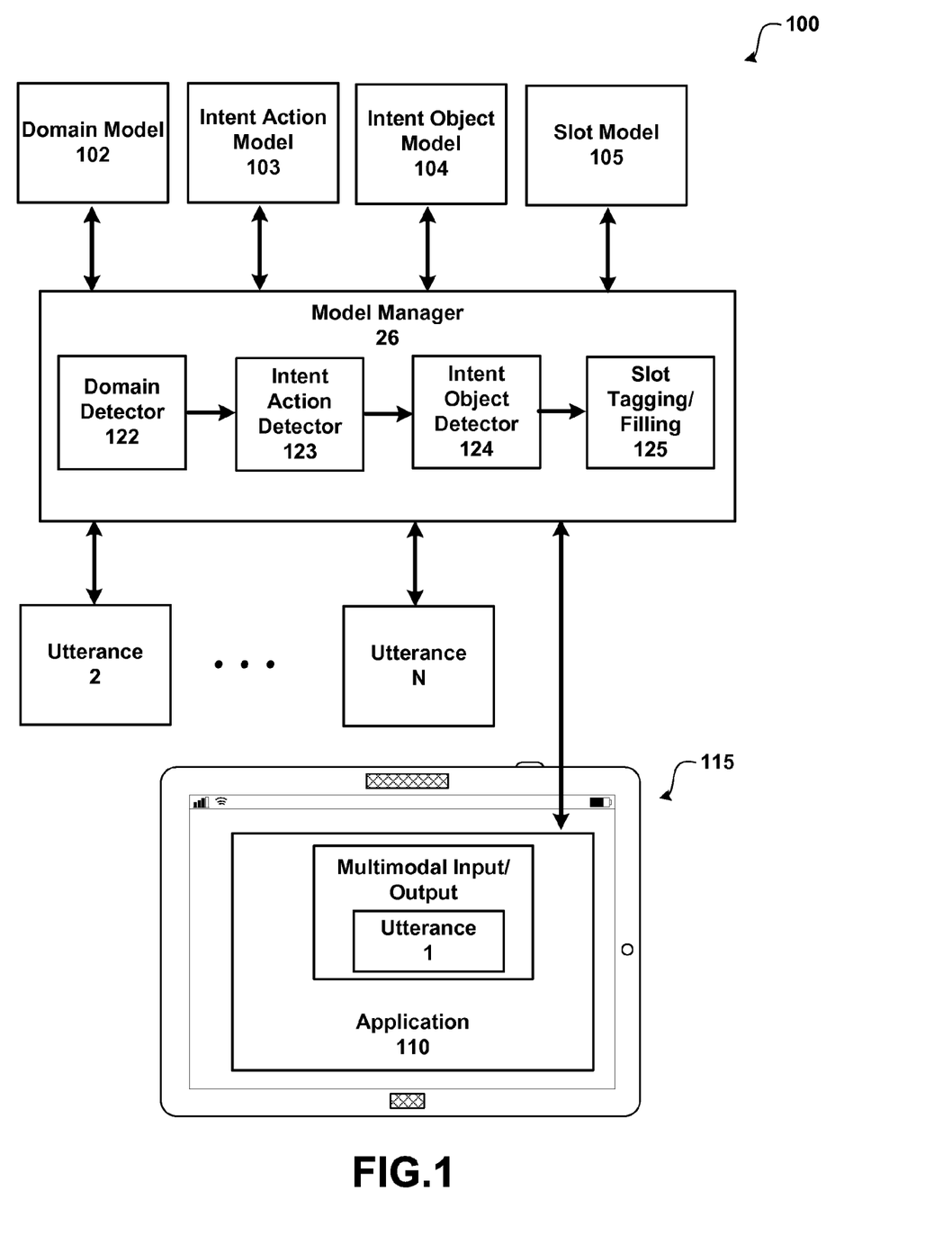
FIG. 1 shows a system for scaling statistical language understanding systems.

FIG. 1 shows a system for scaling statistical language understanding systems. As illustrated, system 100 includes model manager 26, domain model 102, intent action model 103, intent object model 104, slot model 105, utterances, application 110 and touch screen input device/display 115.

In order to facilitate communication with the model manager 26, one or more callback routines, may be implemented. According to one embodiment, application program 110 is a multimodal application that is configured to receive speech/text input and/or input from a touch-sensitive input device 115 and/or other input devices. For example, voice input, keyboard input (e.g. a physical keyboard and/or SIP), video based input, and the like. Application program 110 may also provide multimodal output (e.g. speech, graphics, vibrations, sounds, ... ). Model manager 26 may provide information to/from application 110 in response to user input (e.g. speech/text/gesture). For example, a user may say a phrase (e.g. an utterance) to identify a task to perform by application 110 (e.g. selecting a movie, buying an item, identifying a product, ... ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

A scalable statistical language understanding (SLU) system 100 scales across domains and intents (i.e. single vs. multiple intents per utterance). For each domain added to the SLU system, a fixed number of existing models is updated to reflect the newly added domain. According to an embodiment, the models include domain model 102, intent action model 103, intent object model 104 and slot model 105. Domain model 102 includes information used to detect/classify domains. For example, multiple domains may be identified within a single utterance (e.g. find the last fifty number one songs and post them to my website). Instead of adding a completely new intent model and a new slot model as in existing systems, the existing models are updated for each domain added to a system. In this way, information that is already included in the existing models may be re-used. Training data may also be shared across domains and intents. As such, when a new domain is added, the amount of training data used to train the domain may be less as compared to traditional models that create a completely new model. For example, training data for intent actions may be common across a variety of different domains.

Model manager 26 may be configured to add domains as well as use the fixed number of models when classifying the utterance.

The domain detector 102 identifies different domains identified within an utterance. An utterance may identify a single domain or multiple domains. For example, an utterance may identify both a movie domain and a social domain. All/portion of the detected domains may be used to determine associated intent actions. For example, a threshold may be set and/or some other classifier may be used to select domains that are determined to be relevant to the utterance (e.g. detected domains with greater than a 30% probability).

The identified domains are used to determine associated intent actions (e.g. the actions that are associated with the detected domain(s)) by intent action detector 123. An intent action is the action to be performed (e.g. find, post, play, buy . . . ).

For each determined intent action, one or more intent objects are identified by intent object detector 124. An intent object is an object that relates to that determined intent action. The intent object is the object of the determined intent action (e.g. movie, picture, item, . . . ). Slot/entity tagging/filling is performed by slot tagging/filling 125 using the determined domains, intent actions, and intent object detector. In this way, an utterance that applies to multiple domains is appropriately tagged.

Using the architecture as described in system 100, the classifiers may be multi-class, multi-label classifiers that may provide a ranked list of hypothesis. Binary classifiers may also be used. Each of the hypothesis of an upstream stage (e.g. domain detector 122 is upstream from intent action detector) may lead to the generation of a list of hypothesis that will be the input of the subsequent stages. Thresholds may be applied at one or more of the stages to limit the number of hypotheses produced by that stage. These thresholds may be estimated from annotated training data. The models (classifiers and entity detectors) may be trained using shared data from various domains and dialog act verbs and objects. A final ranking of the combined hypothesis may be performed by a ranking model that combines the scores produced by each stage. More details are provided below.

Figure 2:
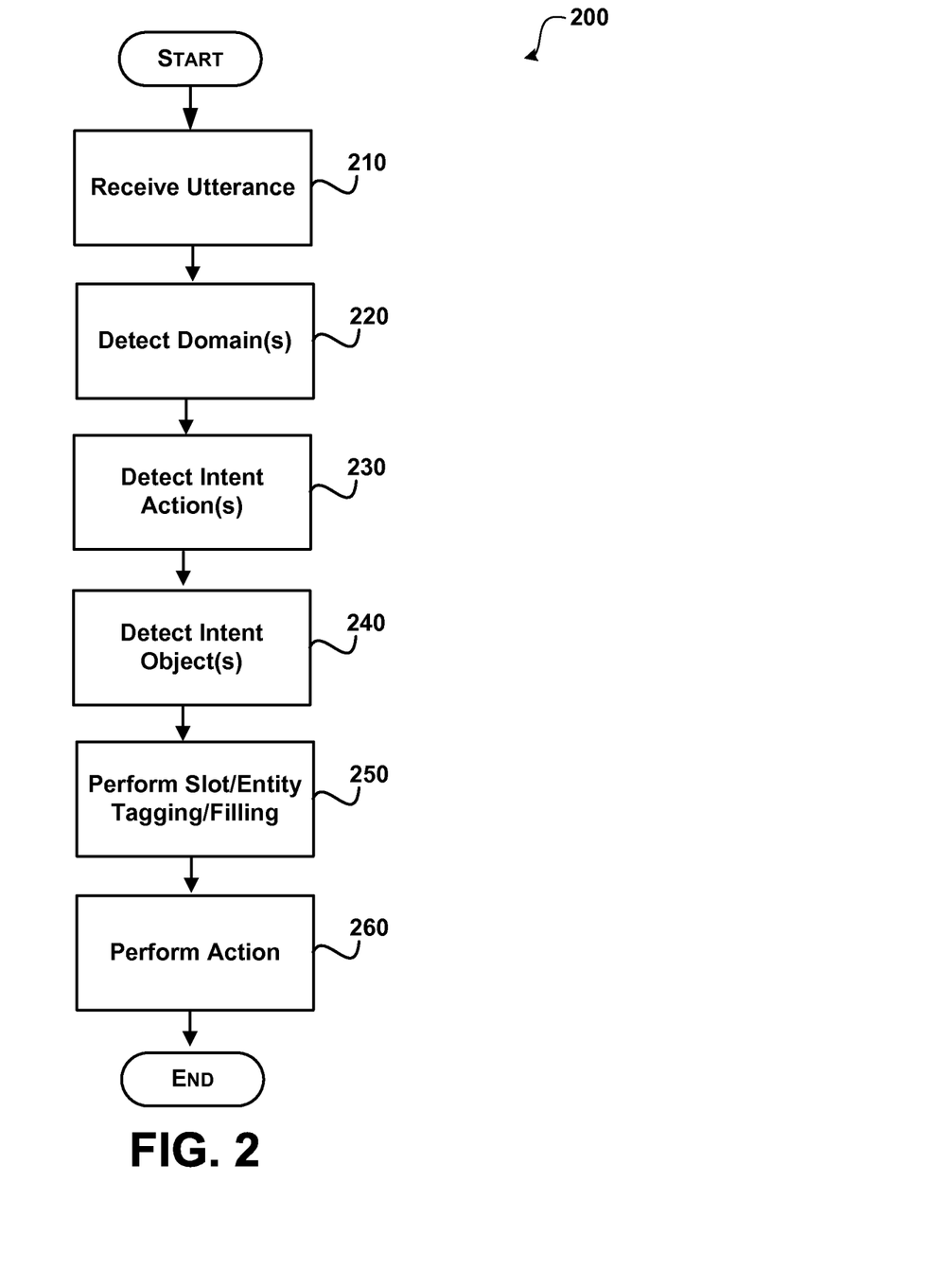
FIG. 2 shows a process for detecting multiple domains, actions, and objects within an utterance.
Figure 3:
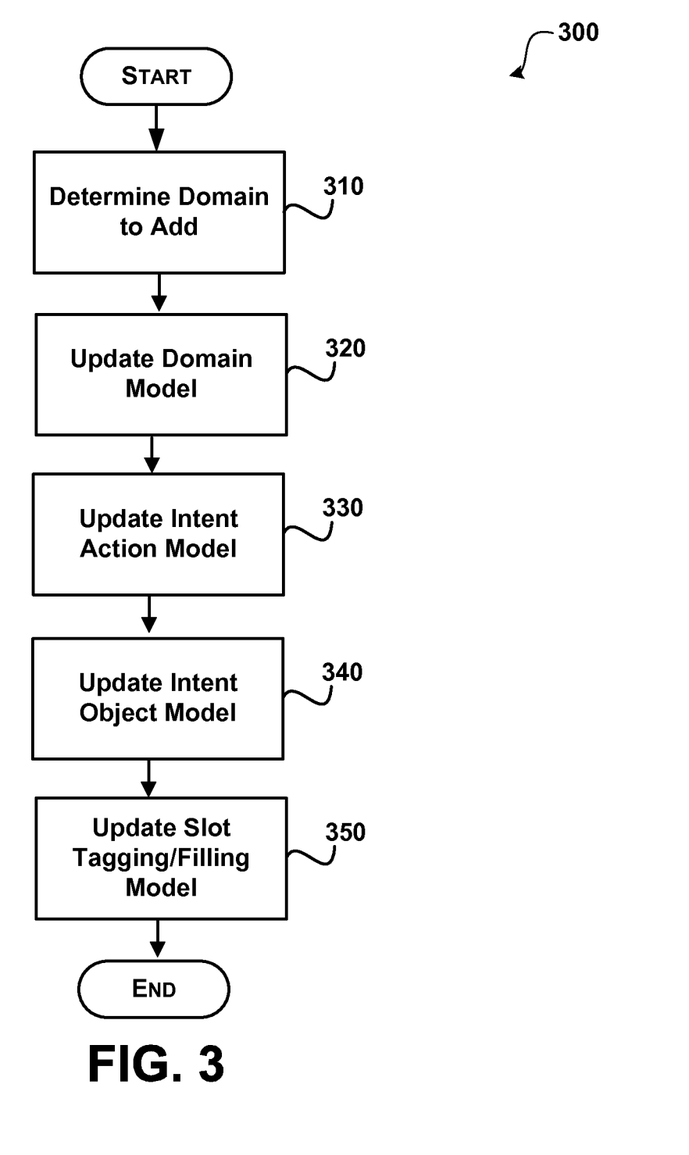
FIG. 3 shows a process for scaling models used in a statistical language understanding system.

FIGS. 2 and 3 shows illustrative processes (200, 300) for scaling statistical language understanding systems using a fixed number of models. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

While an order within the exemplary processes is shown in FIGS. 2 and 3, the order of domain/intent/slot detection is not fixed any may be any of the potentially 12 different ways. For example, slot tagging may be first, followed by the domain and intent action/object detection. The specific choice of the order depends on the application.

FIG. 2 shows a process 200 for detecting multiple domains, actions, and objects within an utterance.

After a start operation, the process moves to operation 210, where an utterance is received. Generally, a user provides an utterance to a system, such as a natural language understanding system, to perform some action(s). For example, a user may speak the utterance "find the most recent tom cruise movie and post this link on social network site X."

Flowing to operation 220, the domains associated with the utterance are detected. Generally, a domain is an area that is associated with a set of actions (e.g. movie domain, music domain, book domain, game domain, flight domain, . . . ). Zero or more domains may be detected depending on the domains contained within the domain model. For example, a domain model may initially include one domain (e.g. movies) that is then extended to include another domain (e.g. social). More domains may be added/removed from the domain model. In the example utterance provided above, two different domains may be detected (e.g. movie and social) that are applicable to the utterance (e.g. some detected domains may be filtered out). The detected domains may be ranked (e.g. scored) for use in determining what domains to use. For example, a threshold may be set such that a domain is used when the score of a detected domain is above the threshold.

Moving to operation 230, the output of the domain detection is used to determine the intent action(s) that are associated with each of the detected domains. One or more intents may be detected. An intent action is an action to be performed (e.g. find, post, play, buy . . . ). In the example utterance provided above, the intent actions detected include "find" and "post." The detected domains may/may not be used to assist in detecting any intent actions. The intent action domain may tag different intent actions according to the domain(s) the intent action is associated with. For example, the intent action "find" may be associated with many different domains (e.g. movie, games, books, flight, . . . ) whereas the intent action "post" may be associated with a single domain (e.g. social).

Transitioning to operation 240, the intent object(s) are detected. For each determined intent action, one or more intent objects are identified. An intent object is an object that relates to that determined intent action. The intent object is the object of the determined intent action (e.g. movie, picture, item, . . . ). In the example utterance provided above, the intent objects detected include "movie" and "picture."

Flowing to operation 250, the slot/entity tagging is performed. According to an embodiment, a single slot/entity model is used to determine the slots to fill. In the example utterance provided above, the slots include a ReleaseDate slot that is set to "most recent", a MovieStar slot that is set to "tom cruise", a MovieType slot that is set to "movie", an ItemType slot that is set to "picture" and a SocialMedia slot that is set to "X." Other domains include other types of slots. For example, a travel domain may comprise slots for departure location, departure time, arrival time, arrival destination, travel method, constraints (e.g., lowest cost, no layovers, etc.). A dining domain may comprise slots for cuisine type, time, party size, reservation needed, relative location (e.g., in walking distance, near a transit station, etc.).

Moving to operation 260, the action associated with the detected domains, intents, and objects is performed.

The process then moves to an end operation and returns to processing other actions.

FIG. 3 shows a process 300 for scaling models used in a statistical language understanding system.

After a start operation, the process moves to operation 310, where a domain to add to an understanding system is determined. In typical language understanding systems, two new models (intent and slot models) are created each time a domain is added. These two new models are added for each new domain (e.g. two models for domain 1, two models for domain 2, . . . ). The number of models used by existing systems explode when different languages are supported and more domains are added. For example, when the number of domains supported is 3 and the number of languages supported is 3, the number of models used by the system is 21. When the number of domains supported is 10 and the number of languages supported is 10, the number of models used is 210. In contrast, the language understanding system described herein uses a fixed number of models. According to an embodiment, four models are used regardless of the number of supported domains. For example, four models (domain model, intent action model, intent object model and slot/entity tagging model) are used to support one domain, two domains, up to N domains. Four additional models are added for each language supported. Instead of using 210 models to support 10 domains and 10 languages, the scaling statistical language understanding system described herein uses 40 models.

Flowing to operation 320, the domain model is updated with the new domain to add. For purposes of explanation, assume the understanding system currently supports four different domains (movies, music, games and generic commands) and that a sport domain is to be added. Instead of adding two new models to the understanding system, the existing domain model is updated to detect the new domain when language relating to the domain is located within an utterance.

Transitioning to operation 330, the intent action model is updated to support any new intent actions that are not already included in the intent action model. Many intent actions associated with the new domain may already be supported by the intent action model before being updated. For example, "get" and "find" intent actions that are associated with the sports domain may already be supported by the intent action model. Zero or more intent actions may be added to the intent action model (e.g. "schedule", . . . ). Existing training data may be used to train the intent action model to include the intent actions that are associated with the new domain.

Moving to operation 340, the intent object model is updated to support any new intent objects that are not already included in the intent object model. Many intent objects associated with the new domain may already be supported by the intent object model before being updated. For example, the intent objects already supported may include "game", "photos", "person information." Zero or more intent objects may be added to the intent object model (e.g. "news", . . . ). Existing training data may be used to train the intent object model to include the intent objects that are associated with the new domain.

Flowing to operation 350, the slot/entity tagging model is updated to support the new domain. According to an embodiment, a single slot model is used to support the domains. The slots may be associated with one or more different domains/actions/intents.

Figure 4:
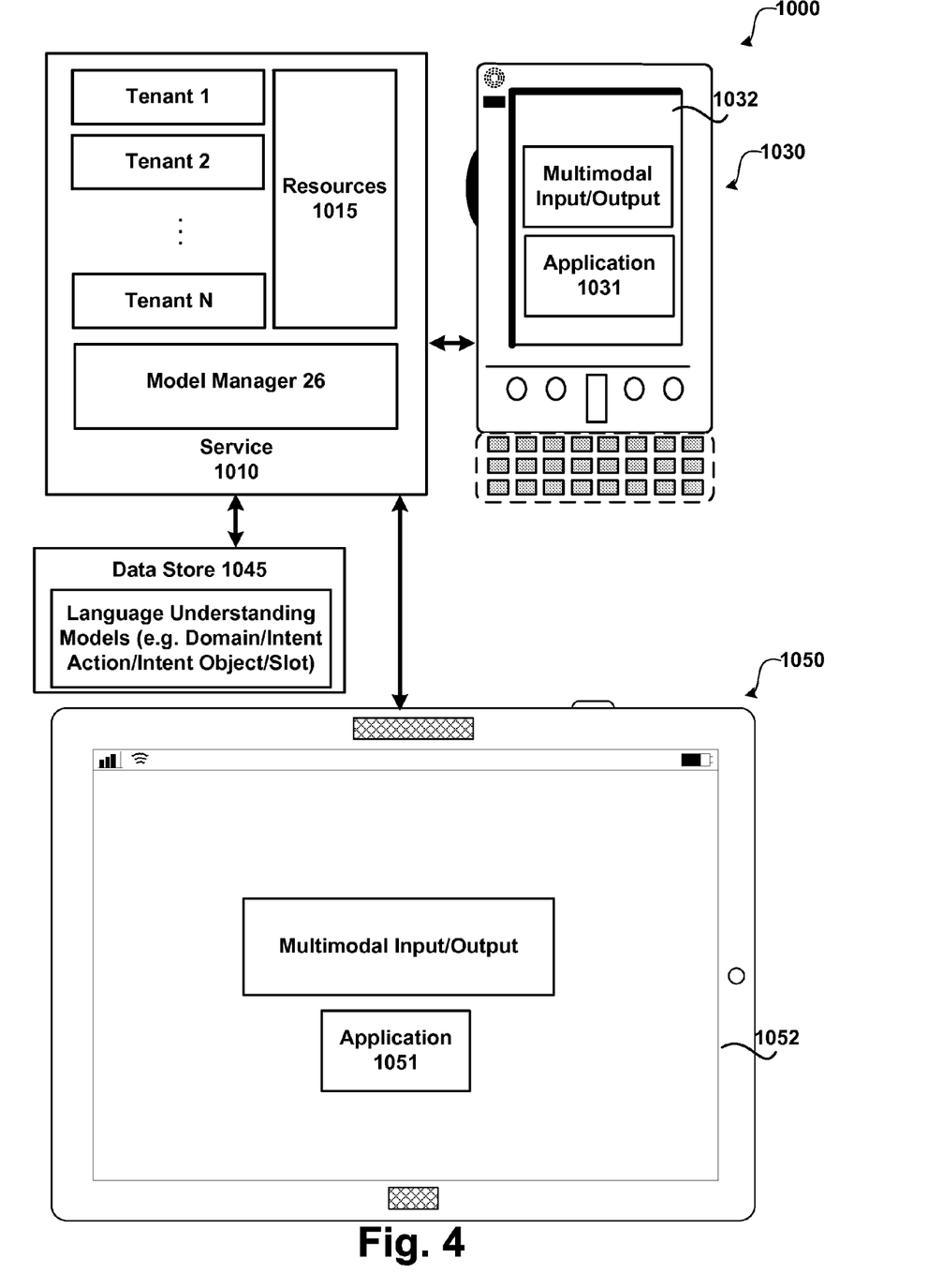
FIG. 4 illustrates an exemplary statistical language understanding system that includes a fixed number of models that may be scaled.

FIG. 4 illustrates an exemplary statistical language understanding system that includes a fixed number of models that may be scaled. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services that receive utterances to interact with the service, such as multimodal services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant language understanding service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with multimodal applications (1031, 1051).

As illustrated, touch screen input device/display 1050 and smart phone 1030 shows exemplary displays 1052/1032 showing the use of an application that utilize multimodal input/output (e.g. speech/graphical displays). Data may be stored on a device (e.g. smart phone 1030, slate 1050 and/or at some other location (e.g. network data store 1045). Data store 1054 may be used to store the four models used by the language understanding system. The applications used by the devices may be client based applications, server based applications, cloud based applications and/or some combination.

Model manager 26 is configured to perform operations relating to scaling statistical language understanding systems as described herein. While manager 26 is shown within service 1010, the all/part of the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
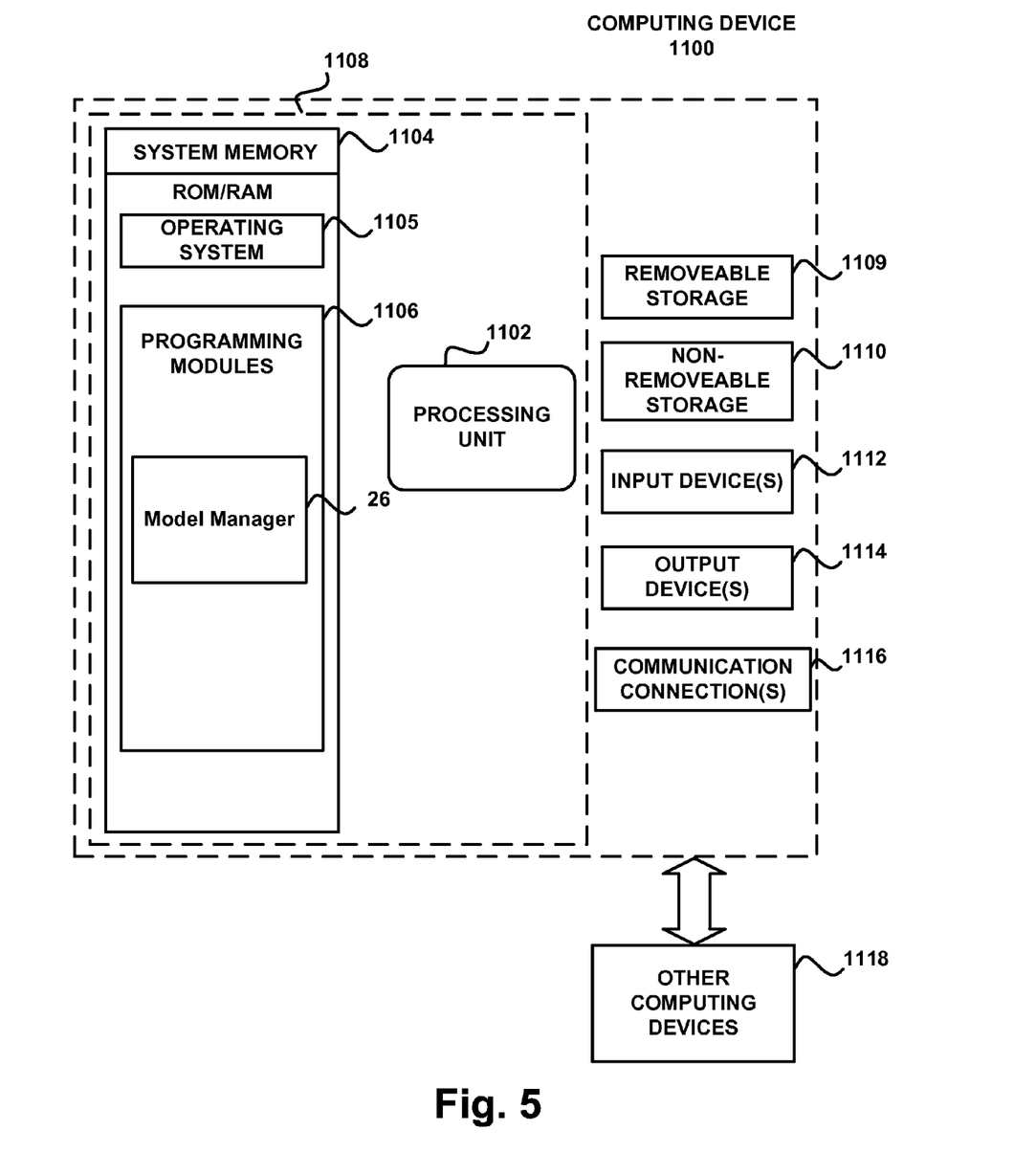
FIGS. 5-7 and the associated descriptions provide a discussion of a variety of operating environments in which embodiments of the invention may be practiced.
Figure 6A:
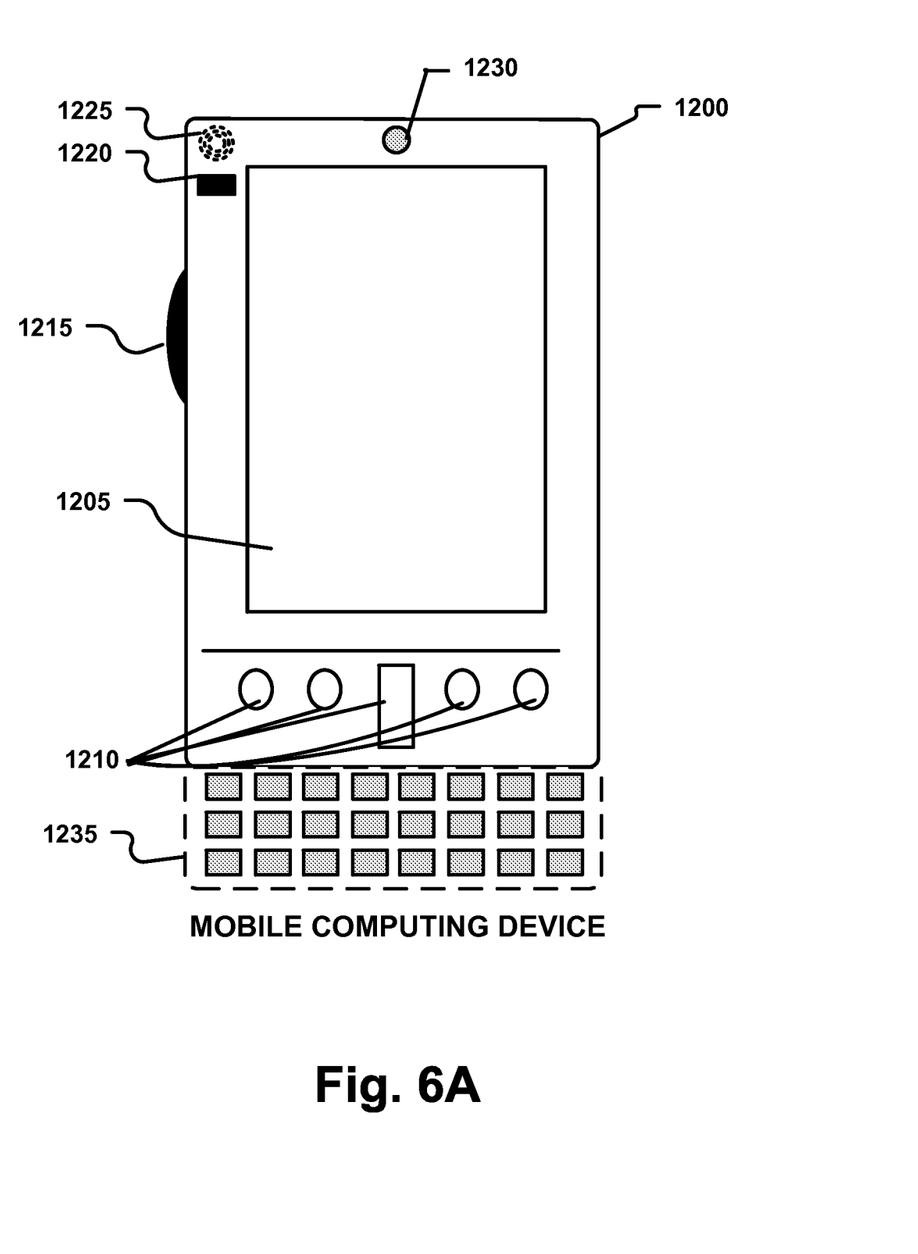
Figure 6B:
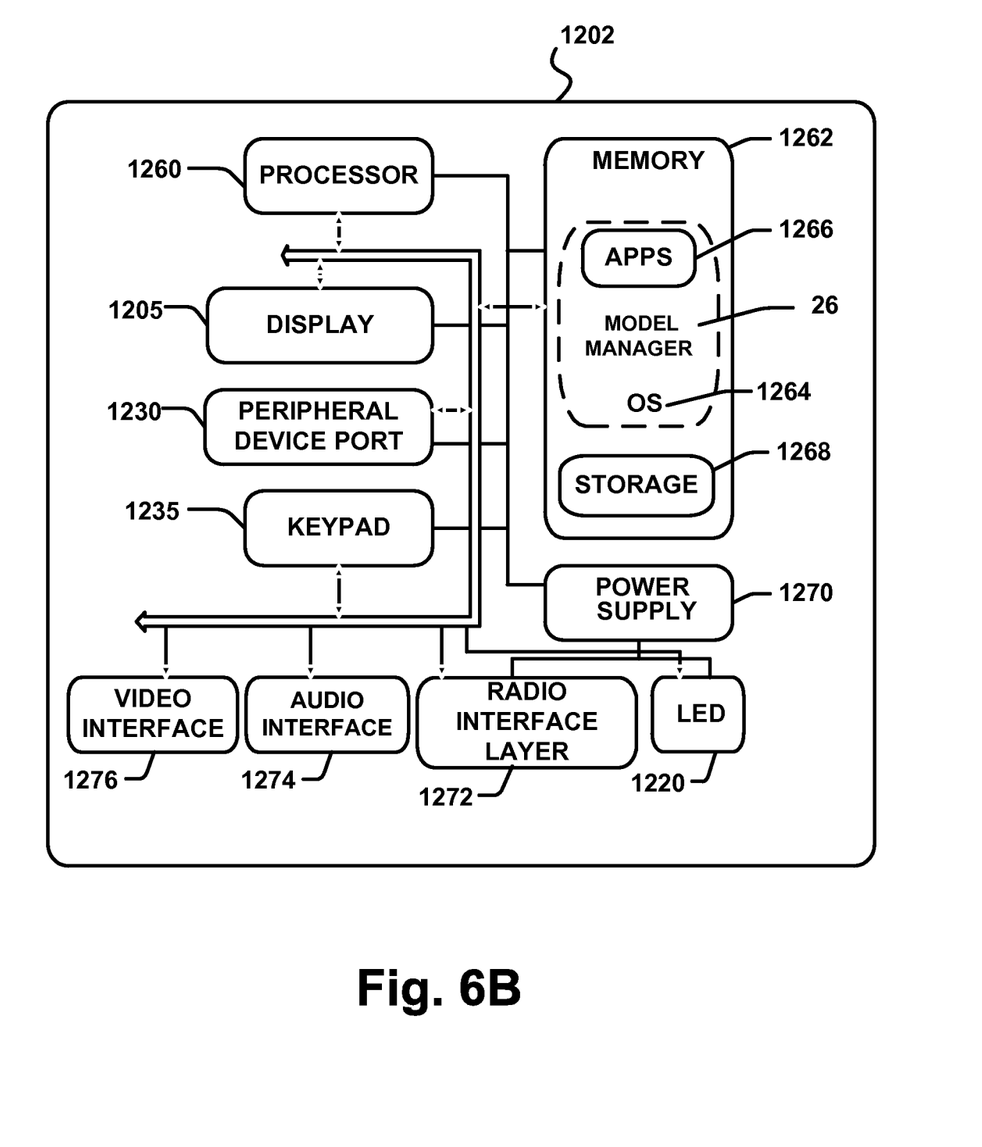
Figure 7:
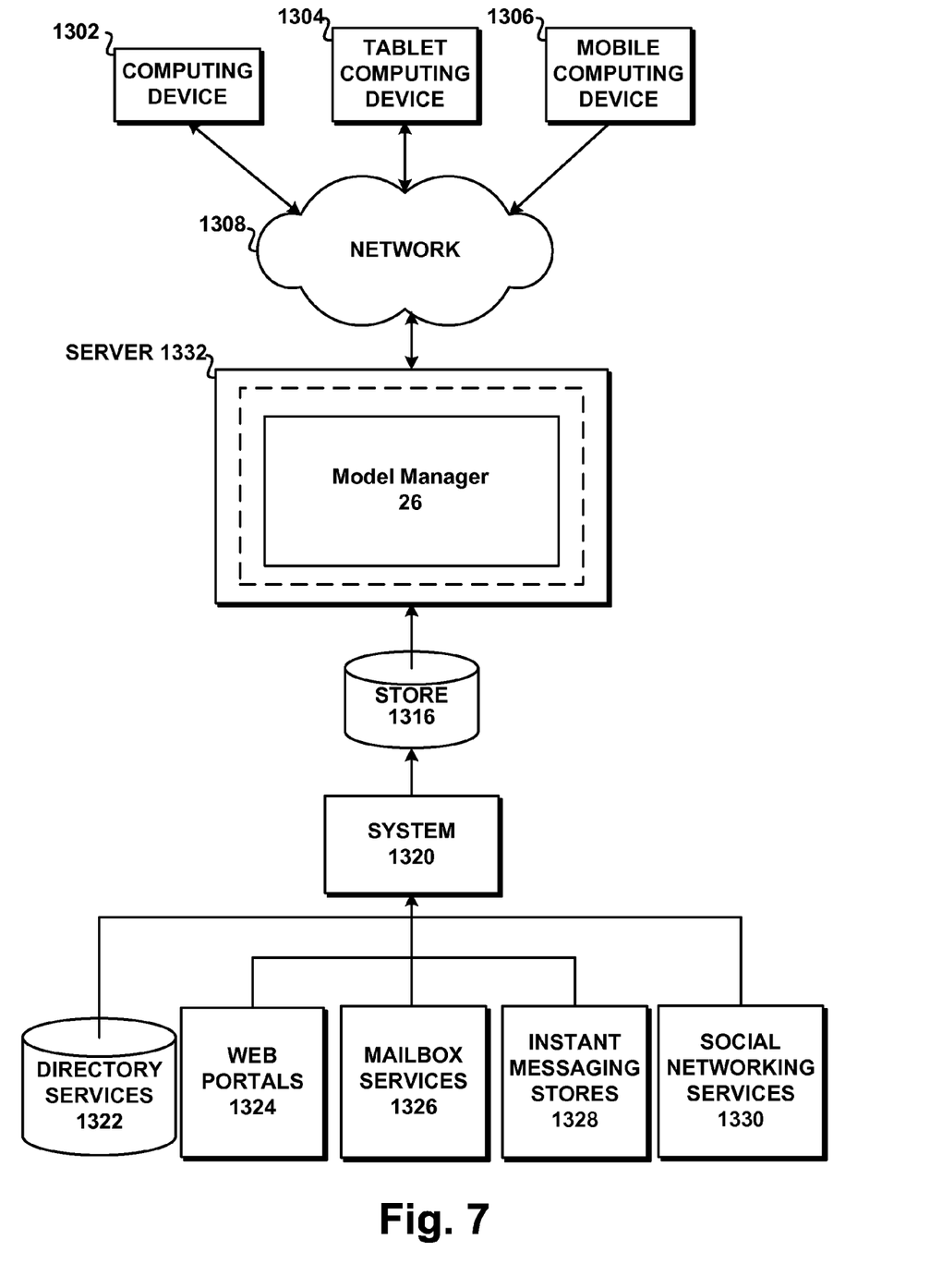

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a model manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 5 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the model manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 8B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for a system as described herein.

Components managed via the model manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to using and determining variations. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for scaling a language understanding system, comprising:
 receiving, by a computing device, an utterance using the language understanding system;
 detecting, by the computing device, a plurality of domains that are associated with the utterance;
 detecting, by the computing device, a plurality of actions from the utterance for each detected domain of the plurality of domains;
 associating, by the computing device, each action of the plurality of actions with one or more of the detected plurality of domains;
 detecting, by the computing device, a plurality of objects from the utterance for each detected action of the plurality of actions;
 training at least one model by applying a threshold hypothesis to at least one stage from a model manager, whereby training data is shared across different domains supported by the language understanding system; and
 performing, by the computing device, slot filling, wherein at least one slot is filled, the at least one slot further defining at least one of the plurality of domains or the plurality of objects.

2. The method of claim 1, wherein the language understanding system comprises: a domain model; an intent action model; an intent object model; and a slot filling model.

3. The method of claim 1, wherein detecting the plurality of domains that are associated with the utterance comprises accessing, by the computing device, a single domain model that is used to create a list of possible domains detected from the utterance.

4. The method of claim 3, wherein intent objects are shared across different domains.

5. The method of claim 1, wherein detecting the plurality of actions from the utterance comprises accessing, by the computing device, a single intent action model that is used to create a list of possible actions using the detected domains.

6. The method of claim 1, wherein detecting the plurality of objects from the utterance comprises accessing, by the computing device, a single intent object model that is used to create a list of possible objects using the detected domains.

7. The method of claim 1, wherein intent actions are shared across different domains.

8. The method of claim 1, wherein training data is shared across different domains supported by the language understanding system.

9. The method of claim 1, wherein an additional model is not added when a new domain is added to the language understanding system.

10. A computer storage device having computer-executable instructions that, when executed by at least one processor, cause the at least one processor to perform a method for scaling statistical language understanding systems, the method comprising:
receiving, by a computing device, an utterance using the language understanding system, wherein the language understanding system includes at least a domain model; an intent action model; an intent object model; and a slot filling model;
detecting, by the computing device, a plurality of domains that are associated with the utterance;
detecting, by the computing device, a plurality of actions from the utterance for each detected domain of the plurality of domains;
associating, by the computing device, each action of the plurality of actions with one or more of the detected plurality of domains;
detecting by the computing device, a plurality of objects from the utterance for each detected action of the plurality of actions;
training at least one model by applying a threshold hypothesis to at least one stage from a model manager, whereby training data is shared across different domains supported by the language understanding system; and
performing, by the computing device, slot filling, wherein at least one slot is filled, the at least one slot further defining at least one of the plurality of domains or the plurality of objects.

11. The computer storage device of claim 10, wherein the domain model is a single domain model that is used to create a list of possible domains detected from the utterance.

12. The computer storage device of claim 10, wherein the intent action model is a single intent action model that is used to create a list of possible actions using the detected domains.

13. The computer storage device of claim 10, wherein the intent object model is a single intent object model that is used to create a list of possible objects using the detected domains.

14. The computer storage device of claim 10, wherein intent actions included in the intent action model are shared across different domains and wherein intent objects in the intent action model are shared across different domains.

15. The computer storage device of claim 10, wherein training data is shared across different domains supported by the language understanding system.

16. A system for scaling statistical language understanding systems, comprising:
a processor and memory;
an operating environment executing using the processor;
a display; and
a model manager that is configured to perform actions comprising:
receiving by a computing device, an utterance using the language understanding system, wherein the language understanding system includes at least a domain model; an intent action model; an intent object model; and a slot filling model;
detecting, by the computing device, a plurality of domains that are associated with the utterance;
detecting, by the computing device, a plurality of actions from the utterance for each detected domain of the plurality of domains;
associating, by the computing device, each action of the plurality of actions with one or more of the detected plurality of domains;
detecting, by the computing device, a plurality of objects from the utterance for each detected action of the plurality of actions;
training at least one model by applying a threshold hypothesis to at least one stage from a model manager, whereby training data is shared across different domains supported by the language understanding system; and
performing, by the computing device, slot filling, wherein at least one slot is filled, the at least one slot further defining at least one of the plurality of domains or the plurality of objects.

17. The system of claim 16, wherein the domain model is a single domain model that is used to create a list of possible domains detected from the utterance.

18. The system of claim 16, wherein the intent action model is a single intent action model that is used to create a list of possible actions using the detected domains.

19. The system of claim 16, wherein the intent object model is a single intent object model that is used to create a list of possible objects using the detected domains.

20. The system of claim 16, wherein intent actions included in the intent action model are shared across different domains and wherein intent objects in the intent action model are shared across different domains.

* * * * *